No. 616,316. Patented Dec. 20, 1898.
G. W. HADDOX.
MEASURING CABINET.
(Application filed May 9, 1898.)
(No Model.) 2 Sheets—Sheet 1.
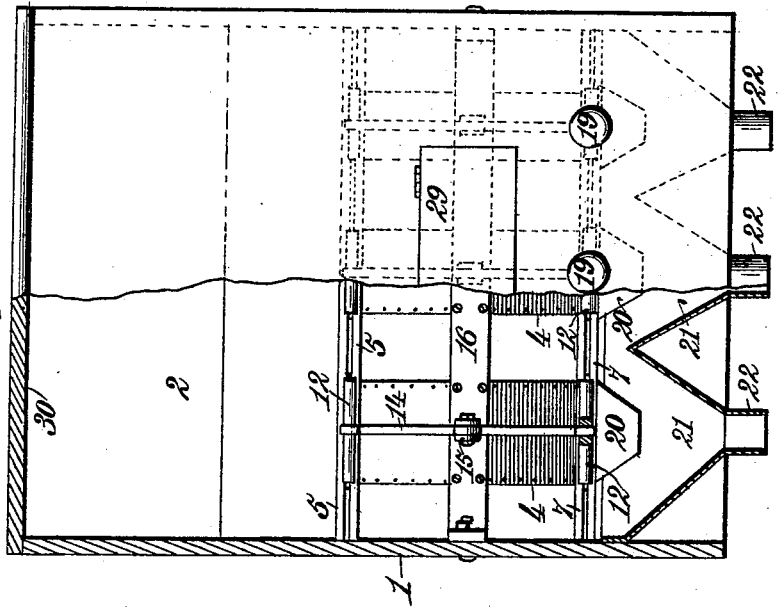
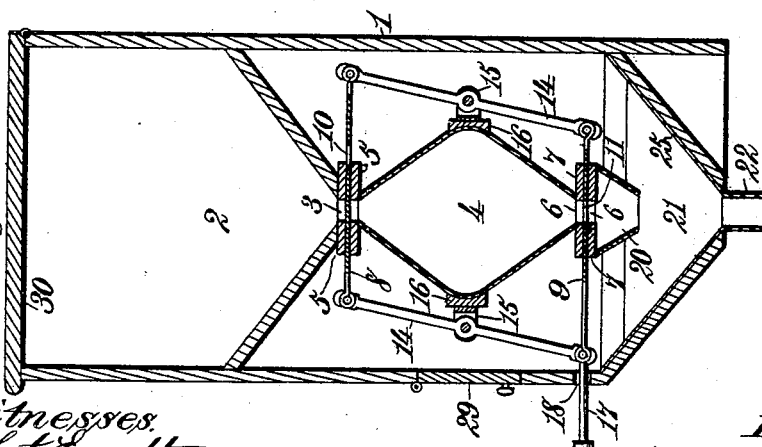
Witnesses
Robert Everett
F. B. Keefer
Inventor:
George W. Haddox.
By James L. Norris.
Atty.

No. 616,316. Patented Dec. 20, 1898.
G. W. HADDOX.
MEASURING CABINET.
(Application filed May 9, 1898.)
(No Model.) 2 Sheets—Sheet 2.
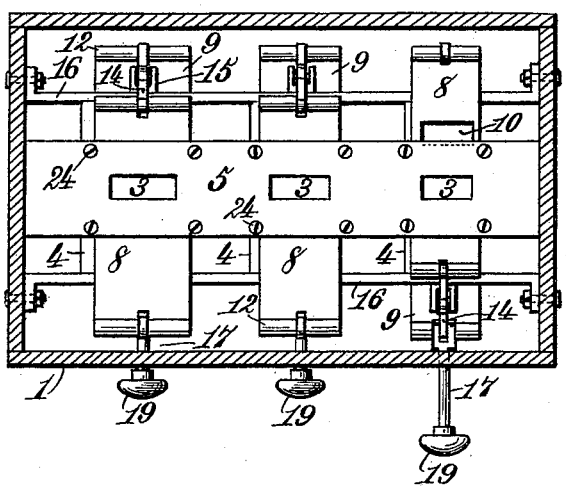
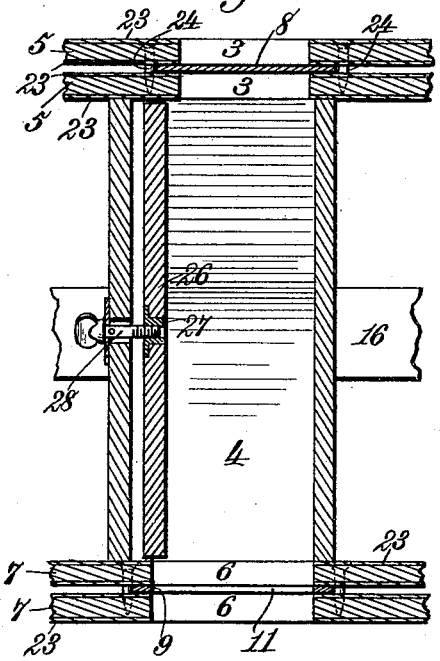
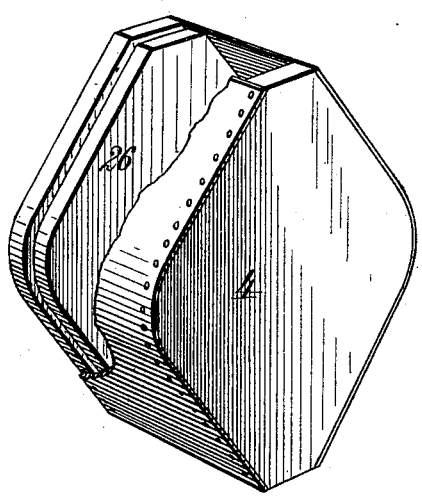
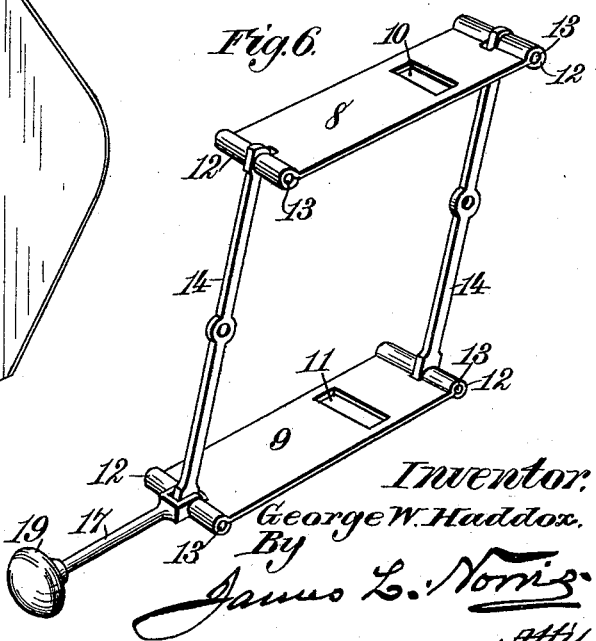
Witnesses
Robert Everett
Inventor
George W. Haddox
By James L. Norris
Atty.

UNITED STATES PATENT OFFICE.

GEORGE W. HADDOX, OF WINCHESTER, VIRGINIA.

MEASURING-CABINET.

SPECIFICATION forming part of Letters Patent No. 616,316, dated December 20, 1898.

Application filed May 9, 1898. Serial No. 680,175. (No model.)

*To all whom it may concern:*

Be it known that I, GEORGE W. HADDOX, a citizen of the United States, residing at Winchester, in the county of Frederick and State of Virginia, have invented new and useful Improvements in Measuring-Cabinets, of which the following is a specification.

This invention relates to a measuring-cabinet of the kind that is adapted for use in retailing sugar and other commodities that are generally sold in quantities of definite or approximately definite weight or by the usual measures of capacity.

It is an object of the invention to provide an improved double-acting slide mechanism for controlling the charging and emptying of any one of a series of measuring-receptacles that differ in capacity according to the quantity of material desired and to so construct the said mechanism that each fully-charged receptacle may be wholly emptied and made ready for further use before any more material is admitted.

My invention consists in features of construction and novel combinations of parts in a measuring-cabinet, as hereinafter more particularly described.

In the annexed drawings, illustrating the invention, Figure 1 is a vertical section of my improved measuring-cabinet from front to rear. Fig. 2 is a part-sectional front elevation of the cabinet. Fig. 3 is a horizontal section of the same above the guides for the upper slides. Fig. 4 is an enlarged vertical section through one of the measuring-receptacles and its adjusting-plate. Fig. 5 is a perspective of one of the measuring-receptacles, partly broken away. Fig. 6 is a perspective of the slide mechanism.

The cabinet 1 may have any desired dimensions. A convenient size to adapt it to the handling of, say, two barrels of sugar at a time would be about five feet high, four feet wide, and about twenty inches to two feet through from front to rear. The upper part of the cabinet is occupied by a hopper 2, having a double-inclined bottom. In the bottom of the hopper there is provided a series of oblong openings 3, through each of which the hopper is adapted to communicate with one of a series of measuring-receptacles 4, mounted beneath the hopper. These openings 3 are formed through two parallel guide-bars 5, that are extended lengthwise of the cabinet and one above the other, with a slight space between, as shown in Figs. 1 and 2.

It is preferable to make each measuring-receptacle 4 with approximately the outlines of a double triangle in vertical cross-section or double-inclined at top and bottom, as shown in Figs. 1 and 5. This form of measuring-receptacle permits filling to its exact capacity with such material as sugar, for instance, and also facilitates a rapid and complete discharge of the quantity measured. Each measuring-receptacle 4 has its discharge through an oblong opening 6, formed in two parallel guide-bars 7, that are extended lengthwise of the cabinet, one above the other, and with a space between, as in the case of the upper guide-bars 5, before mentioned.

For the purpose of controlling the entrance of material into the measuring-receptacles 4 through the upper inlet-openings 3 and its discharge through the lower outlet-openings 6 there are provided a series of upper slides 8 and lower slides 9, each of which is provided with a slot or opening, as 10 and 11, Figs. 1 and 6, to register at the proper time with the openings through the guide-bars 5 and 7, between which the said slides are arranged to operate. The upper slide or cut-off 8 and lower slide or cut-off 9 are connected in such manner as to be actuated in unison and in such a way that passage through one slide is fully closed before a passage through the other slide is opened. This prevents any continuous stream of material through the measuring-receptacle direct from its inlet to its outlet and permits an accurate measurement of the material to be delivered.

As shown in Fig. 6, the ends of the slides 8 and 9 are centrally slotted and provided with eyes 12 for reception of pivots 13, the central portions of which engage the ends of levers 14, that connect the slides 8 and 9 at both ends. Each of these levers 14 is fulcrumed in a yoke 15 on a bar 16, that is extended lengthwise of the cabinet. There are two longitudinally-extended bars 16, as shown in Figs. 1 and 3, one bar being at each side of the series of measuring-receptacles and secured thereto. The ends of these bars 16 are preferably made with right-angled extensions, through which the bars are bolted to the ends of the cabinet, as shown in Figs. 2 and 3. It will be seen that by means of the upper and lower guide-bars 5 and 7 and the side bars 16 the series of measuring-receptacles 4 will be firmly supported in the required position within the cabinet.

Each lower slide 9 has connected with its front end an operating-lever 17, that is extended through a guide-opening 18 in the front of the cabinet. The inner end of the lever 17 may be bifurcated, as shown in Figs. 3 and 6, and attached to the pivot 13 at each side of the lever 14 where it connects with said pivot. At its outer end each lever 17 is provided with a knob 19 or other handle.

Below and around the exit-opening of each measuring-receptacle 4 there is a spout 20, having the form of a hollow truncated cone, for guiding or directing discharge of the measured material into one of a series of discharge-hoppers 21, each of which is constructed with an inclined bottom having a tubular discharge-spout 22 in its central portion.

Although the drawings show only three measuring-receptacles of differing dimensions, it will be obvious that the cabinet may be fitted with any number of receptacles desired, and these may each have any capacity suited to varying quantities of material as usually sold. Thus the measuring-receptacles 4 may be graded for, say, one, two, three, four, five, and ten pounds, or other quantities, by measure or approximate weight. By operating the proper slide mechanism the required quantity of material is at once obtained, and may be received in a paper bag placed below and around the spout 22 or in any other receptacle, as desired. It will be observed by reference to Fig. 1 that on pulling out any hand-lever 17 to bring the opening 11 of the lower slide 9 into register with the discharge-opening of the measuring-receptacle the opening 10 of the upper slide will be moved away from the inlet-passage to said receptacle and the said inlet 3 will become completely closed before the outlet 6 is opened. Also on pushing the hand-lever 17 inward the outlet 6 is closed before the inlet 3 opens. Thus there can be no stream of material flowing through the measuring-receptacle and the quantity of material required can be obtained accurately by operating the slide mechanism of the proper receptacle. The arrangement of the levers 14 at both ends of the upper slides 8 and lower slides 9 provides for a "pull" on each slide in the required direction of movement, so that there is no liability of causing the slide to "buckle" in either direction of movement. The slides are preferably made of metal and are arranged to operate between and in close contact with the guide-bars 5 and 7, which may be also made of metal or of wood covered with metal wear-plates 23, Fig. 4, as preferred. If desired, screws 24, Figs. 3 and 4, may be placed in the guide-bars 5 and 7 at the sides of the slides 8 and 9 to serve as guides for said slides, or any other form of guide may be provided. The arrangement of the guide-bars 5 and 7 with relation to the slides 8 and 9 is such that a smooth and uniform operation of the slides is facilitated, with no opportunity for clogging the inlets and outlets of the measuring-receptacles. It may be preferable to provide the bottom of the lower hopper 21 with a zinc lining 25, Fig. 1, or other smooth surface, so that the measured material will be discharged freely.

In order to provide a means for adjusting the capacity of the several measuring-receptacles 4, there may be placed in one side of each receptacle an adjustable plate 26, Figs. 4 and 5, that is extended across the interior of the receptacle from top to bottom and from front to rear. In about the center of this adjustable plate 26 there is inserted a nut 27, engaging a thumb-screw 28, Fig. 4, mounted in one side wall of the measuring-receptacle. By turning this thumb-screw in the proper direction the plate 26 can be moved inward or outward within suitable limits to vary the capacity of the measuring-receptacle, as required. The thumb-screws 28 are concealed within the cabinet, but are accessible through doors 29, Figs. 1 and 2, to make any adjustment required. This adjustment may be provided for only one of the measuring-receptacles or for all, as may be desired. By referring to Fig. 4 it will be seen that the outlet from the measuring-receptacle is preferably of somewhat greater length than the inlet, and it will also be seen that the limit of adjustment for the plate 26 is such that the plate cannot be moved so far in either direction as to afford a lodgment for material on its top edge at the receptacle-inlet nor at any point adjacent to the outlet.

The measuring-receptacles 4 may be made either wholly or partly of metal. Except for the cut-off devices or slides each receptacle is open at top and bottom and requires only two end pieces or plates and the front and side walls secured thereto. The end pieces or plates may be made from wood and the front and side walls may be of zinc or other suitable material.

It is preferable to provide the cabinet with a hinged lid 30, as shown in Figs. 1 and 2.

While it has been mentioned that this measuring-cabinet is designed more especially for use in retailing sugar, it will be obvious that it is adapted also to the convenient handling of various other commodities.

What I claim as my invention is—

1. In a measuring-cabinet, the combination with a measuring-receptacle that is narrowed at top and bottom and provided at the top with an inlet and at the bottom with an outlet, a hopper adapted to communicate with the inlet to said measuring-receptacle, and a discharge-hopper below said receptacle, of a slide having an opening adapted to register with the inlet to the measuring-receptacle, a slide having an opening to register with the outlet from said receptacle, centrally-fulcrumed levers connecting the said slides at both ends, guide-bars above and below each slide, and an operating-lever connected with an end of one of said slides, whereby the slides are movable simultaneously in opposite directions to close the opening at either end of the measuring-receptacle before the other is opened, substantially as described.

2. In a measuring-cabinet, the combination of a measuring-receptacle having an inlet at the top and an outlet at the bottom, an adjustable plate extended across the interior of said receptacle to vary the capacity of the same, a slide having an opening to register with the inlet to said receptacle, a slide having an opening to register with the outlet from said receptacle, centrally-fulcrumed levers connecting the said slides at both ends to exert a pull on the slides in both directions of movement, guide-bars above and below each slide, and an operating-lever connected with an end of one slide, whereby the slides are movable simultaneously in opposite directions to close the opening at either end of the measuring-receptacle before the other is opened, substantially as described.

3. In a measuring-cabinet, the combination of a hopper, a series of measuring-receptacles located below said hopper in communication therewith and differing in capacity, a discharge-hopper below said receptacles, slides at top and bottom of the measuring-receptacles, centrally-fulcrumed levers connecting the said slides at both ends and adapted to control the inlets and outlets of said receptacles, guides for said slides, and operating-levers connected with the lower slides, substantially as described.

In testimony whereof I have hereunto set my hand in presence of two subscribing witnesses.

GEORGE W. HADDOX.

Witnesses:
CHAS. F. NELSON,
A. TAYLOR RITTER.